United States Patent [19]
Krone et al.

[11] Patent Number: 5,205,105
[45] Date of Patent: Apr. 27, 1993

[54] MACHINE FOR RECEIVING AND COMPRESSING AGRICULTURAL HARVESTED CROPS

[75] Inventors: Bernard Krone, Spelle; Wilhelm Ahler, Stadtlohn, both of Fed. Rep. of Germany

[73] Assignee: Maschinenfabriken Bernard Krone GmbH, Spelle, Fed. Rep. of Germany

[21] Appl. No.: 833,249

[22] Filed: Feb. 10, 1992

[30] Foreign Application Priority Data

Feb. 15, 1991 [DE] Fed. Rep. of Germany ....... 4104643

[51] Int. Cl.⁵ ...................... A01F 15/07; A01F 15/08
[52] U.S. Cl. ........................................ 53/118; 53/513; 53/529; 53/587; 83/425.3; 83/564; 83/928
[58] Field of Search ................. 53/118, 513, 514, 515, 53/529, 587, 211, 214; 83/433, 435, 564, 856, 928, 425.3, 425.2, 425

[56] References Cited

U.S. PATENT DOCUMENTS

| | | | |
|---|---|---|---|
| 4,120,223 | 10/1978 | Bosse | 83/433 X |
| 4,589,318 | 5/1986 | Kanski | 83/564 X |
| 4,838,016 | 6/1989 | Frogbrook et al. | 53/118 X |
| 4,995,216 | 2/1991 | Vansteelant | 53/587 X |
| 5,036,642 | 8/1991 | Underhill | 53/587 X |

*Primary Examiner*—James F. Coan
*Attorney, Agent, or Firm*—Jordan and Hamburg

[57] ABSTRACT

A machine for receiving and compressing agricultural harvested crops, such as hay, straw or grass, to roll-shaped bales with a coiling chamber, which can be swung open and moved by means of a chassis comprises a front chamber housing and a rear chamber housing, which is coupled pivotably to the front chamber housing for forming the boundary of a front and a rear bale-forming space. A first bale conveyor is allocated to the front bale-forming space and a second bale conveyor, which can be caused to move in a direction of rotation opposite to that of the first bale conveyor, is allocated to the rear bale-forming space. The first bale conveyor and the second bale conveyor are guided over at least one upper and one lower stationary deflector rolls which are supported so that they can rotate at the housing wall parts. At the mutually facing, inner upper and lower halves of the first and second bale conveyors, an inner tension guide roll can be applied, which can be transferred from a starting position with increasing bale size against the force of a tension force generator of a bale conveyor tensioning apparatus into an elevated tension guide position. Particularly in order to have a machine with a variable bale-forming space, with which harvested crops in the cut shape can also be molded in a structurally simple manner, the harvested crops conveyor has a cutting apparatus having cutting knives, which are disposed next to one another, are secured pivotably, can be acted upon with a spring force and can be transferred from an initial cutting position into a cutting position by means of a switching mechanism as a function of the operating position of a tension and compensating roller or a tension guide roller.

20 Claims, 9 Drawing Sheets

MACHINE FOR RECEIVING AND COMPRESSING AGRICULTURAL HARVESTED CROPS

The invention relates to a machine for receiving and compressing agricultural harvested crops, such as hay, straw or grass, to roll-shaped bales in a formation.

BACKGROUND OF THE INVENTION

Machines of the aforementioned type with a bale-forming space, which is variable with respect to size of the bale that is to be formed, are known in different designs. Bales of different size but, as far as possible, comparable compression, are to be formed with these machines in order to be able to utilize these machines for different application and requirement. Known machines of this type have one or more bale conveyors(s), the position of which can be changed. These bale conveyors are in the form of bale conveying belts or similar conveying elements, which are guided by deflector rollers, which are secured so that they can pivot. During the bale-forming process, these bale conveyors act together with harvested crop conveyor, which is disposed downstream in the conveying direction from the harvested products receiver, so that the bale conveyor(s) and the harvested crop conveyor act upon the bale that is to be formed during the bale forming process. The German Offenlegungsschrift 37 34 186, for example, discloses a machine of this type, in which two bale conveyors are provided in the form of endless belts, which during the bale forming process work together with a harvested crop conveyor that is disposed in the bottom region of the machine. This harvested crop conveyor likewise has several endless belts, which are disposed next to one another and are driven in a common revolving direction.

As against such machines, conventional, fixed chamber machines are known, in which a cutting device for comminuting the harvested crop that is to be compressed is assigned to the inlet opening of the machine. In particular, such a machine serves for forming a long-fibered harvested crop, such as straw, in the cut state into a bale, which can be broken up more easily for feeding. In the German Offenlegungsschrift 38 16 204, such a machine is described, in which the cutting mechanism has several cutting knives, which are mounted so that they can be swiveled and protrude into a conveying gap or channel of the machine. The cutting tools can be swiveled in such a manner, that in their initial cutting position they do not exert any cutting action on the fiber material. With that, a bale is to be formed, the core region of which consists of uncut fiber material, which beyond that, however, has cut, more easily broken up fiber material. This machine is very expensive to construct, since special conveying and cutting devices with special drives and control elements are required. This has a disadvantageous effect on the production costs.

SUMMARY OF THE INVENTION

It is an object of the present invention to provide in a structurally simple manner a machine of the initially described type, with which bales of different sizes can be formed in such a manner that they have regions of cut and of uncut harvested crops.

With the cutting tools, which are assigned directly to the harvested crops conveyor, the harvested crops, which are to be subjected to the bale-forming process, can be comminuted in a particularly simple manner without requiring special cutting devices with additional conveying elements, driving mechanisms, control elements, harvested crops guiding channels or zones, etc. Since the already exisiting harvested crops conveyor acts upon the bale, which is to be formed, jointly with the bale conveyor or conveyors during the bale forming process, the cutting tools, for example, when a certain bale size or bale diameter has been reached, should be transferred from their starting position, in which they are within the harvested crops conveyor or within the conveying area of its conveying tools, into their cutting position, so that they can cut into the bale that is to be formed. For this purpose, the cutting tools can be constructed in an advantageous manner with respect to their dimensions and shape, so that, depending on the thickness of the mat of harvested crops supplied to the bale-forming process, they can penetrate and cut the mat that is to be molded. Due to the displaceable bale conveyor or conveyors, the bale to be formed is acted upon during the bale-forming process with a force, which acts in addition to the force of the weight of the bale, is aligned with the harvested crops conveyor and therefore also with the cutting tools and can be used as a cutting force on the bales. The cutting tools can also be provided for differently fashioned harvested crops conveyors. For example, the harvested crops conveyor may comprise several endless belts, chains, etc., which are disposed next to one another or, as provided for by a preferred development variation of the invention, can be constructed as a conveyor roller. Likewise, it is possible that the machine has only one bale conveyor or, for example, a first bale conveyor which is assigned to the front bale-shaping space of a coiling chamber and a second bale conveyor which is assigned to the rear bale-shaping space.

In a structurally particularly simple development of a harvested crops conveyor, which is constructed as a conveyor roller, an annular accommodating space for the tool holders of the cutting tools is provided between the conveyor roller segments. In this annular accommodating space, the cutting tools are in their initial cutting position. The cutting tools can likewise, as provided for in a preferred development of the invention, be activated, without requiring additional special control devices, by means of the change in position of a deflector roller, compensating roller or tension roller or quite generally of a tension element of a bale conveyor that has been provided, so that the structural dimensions of the machine as a whole are not enlarged by the cutting tools that have been provided for the machine.

For a further explanation of the invention, reference is made to the drawing and the subsequent description. In the drawing, the invention is explained by means of an embodiment of a machine, which in a particularly advantageous manner has tension conveyors that can be adjusted with in each case independently of one another to a particular tension force and is an object of the German patent application P 40 12 755.9, to which reference is made supplementarily to the following description.

DESCRIPTION OF THE PREFERRED EMBODIMENTS

Figure 1:
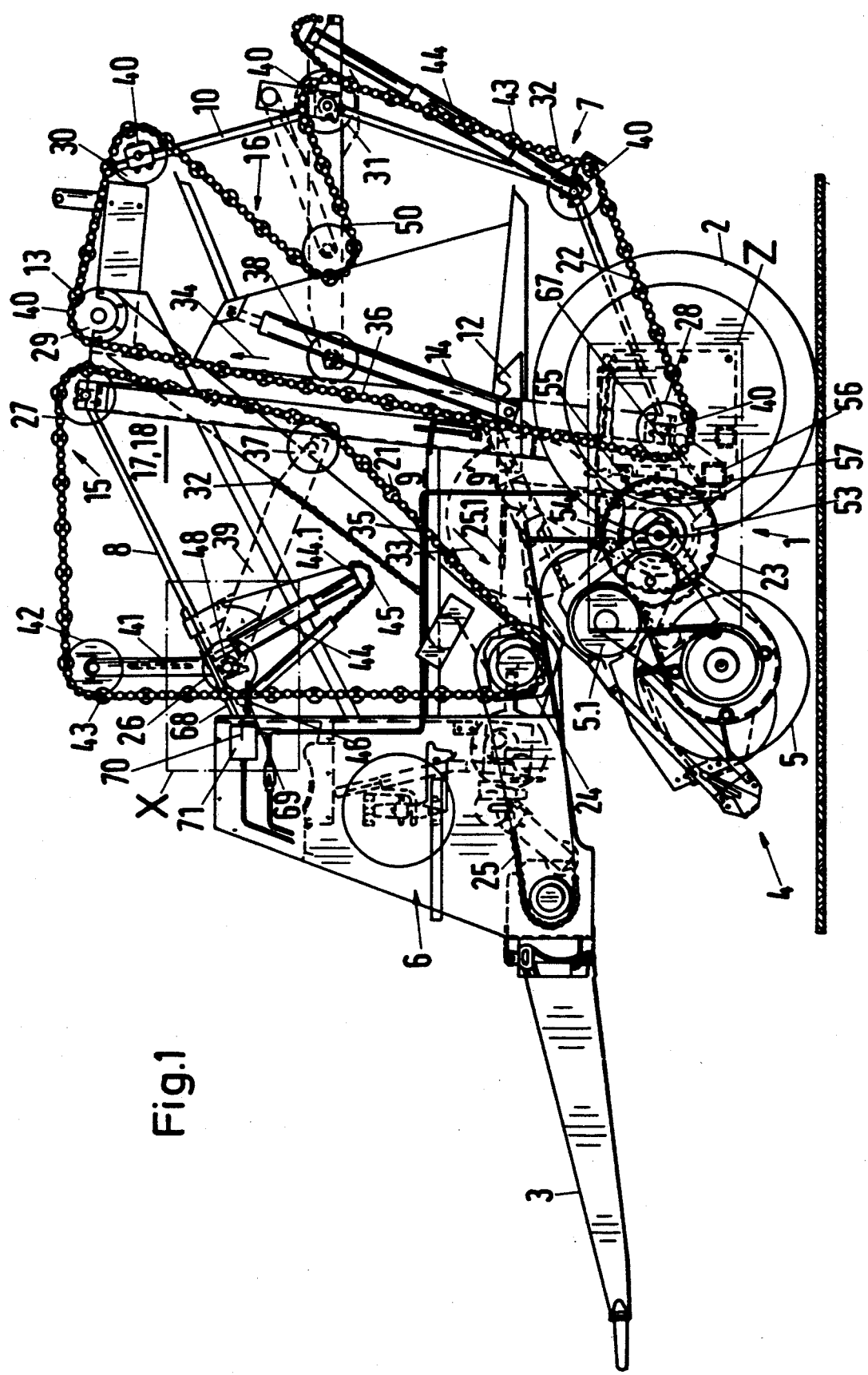
FIG. 1 shows a diagrammatic side view of an embodiment of the invention in the starting position of the bale conveyor at the start of the bale-forming process.

The machine shown in the drawings for receiving and compressing agricultural harvested crops into roll-shaped bales has a chassis, which generally is labeled 1, with wheels 2. The machine can be hitched by a tension hitch 3 to a tractor. In the working direction of the machine, the wheels 2 are preceded by a receiving facility 4 with pickup 5 and a transverse feed screw 5.1 of the usual construction and the like. The machine can be coupled to and driven by the tractor by means of a universal drive connection, the details of which are not shown and by means of which the moving parts, such as the pick-up 5, enveloping equipment 6 and the like, as well as the bale conveyor, which is still to be described, are set in driving motion.

On the chassis 1, a coiling chamber 7 is disposed, which comprises a front chamber housing 8 for forming the boundary of a front bale-forming space, as well as a rear chamber housing 10 for forming the boundary of a rear bale-forming space. After a locking connection 12 is undone and the bale with the desired diameter has been formed, the rear chamber housing 10 is transferred into its open position by means of a hydraulic cylinder 14 and the finished bale is therefore passed out.

For the embodiment illustrated, a first bale conveyor 15 is allocated to the front bale-forming space 9 and a second bale conveyor 16 is allocated to the rear bale forming space. The first and second bale conveyors are formed by coiling chains 21, 22, guided at the inner region of the housing side wall parts, as well as by tubular, transverse rods held at these chains. The first bale conveyor 15 is controlled by a total of three stationary deflector rollers 24, 26, 27, which are supported so that they can rotate at the housing side wall parts of the front chamber housing 8. Moreover, the lower outer deflector roller 24 in FIG. 1 can be driven by way of a chain drive 25. The conveyor roller, which forms the lower harvested crops conveyor 23, is disposed in the lower bale-forming space and will be described in greater detail in the following, and is driven over a further chain drive 25.1.

The second stationary deflector roller 26 is disposed above the deflector roller 24. At the upper front housing end facing the rear chamber housing 10, the upper deflector roller 27 is provided, which, for the embodiment illustrated, therefore essentially fixes the dimensions of the machine in the upwards direction. The second bale conveyor 16 is guided over a lower stationary deflector roller 28, an upper deflector drive roller 29, which is disposed essentially at the same height and next to the upper deflector roller 27 of the first belt conveyor 15 and which, moreover, has an axis of rotation that coincides with the swiveling axis 13 and, in the rear region of the machine, over further stationary deflector rollers 30, 31 and 32, which are mounted on axle shafts 40. The upper deflector drive roller 29 of the second bale conveyor 16 is coupled over a chain drive 32 with the lower driven deflector roller or driven deflector drive roller 24 of the first bale conveyor so as to drive it and so that, after the conveyors 15 and 16 are started up, these can be set in motion in the opposite directions indicated by arrows 33 and 34. At the inner parts of the conveyor belts 35 and 36, which are facing one another during the operation of the machine, inner tension guide rolls 37 and 38 can be applied, which are linked with one another over a connecting axle shaft, as described in greater detail in the German patent application P 40 12 755.9, which is hereby incorporated herein by reference. The tension guide roll 37 is held so that it can rotate at a pivoted lever arm 39, which in turn is supported at the axle shaft 48 of the deflector roller 26. A further lever 41 is pivotably supported at this axle shaft 48. At its other end, this lever 41 secures a tension and compensating roller 42 so that it can rotate. This tension and compensating roller 42 engages the conveyor belt 43 of the first bale conveyor 15. Moreover, a tension force generator, in the form of a hydraulic cylinder 44, is supported at the axle shaft 48. Over the arc-shaped front end 44.1 of the lifting boom of the hydraulic cylinder 44, an unrolling chain 45 is guided, the end of which engages, on one hand, a connecting arm 46 and the pivoted lever arm 39. The basic structure of the net-coiling or enveloping facility 6 is as described in the German patent application P 40 12 741.9, to which reference is likewise explicitly made and which is hereby incorporated herein by reference.

Figure 2:
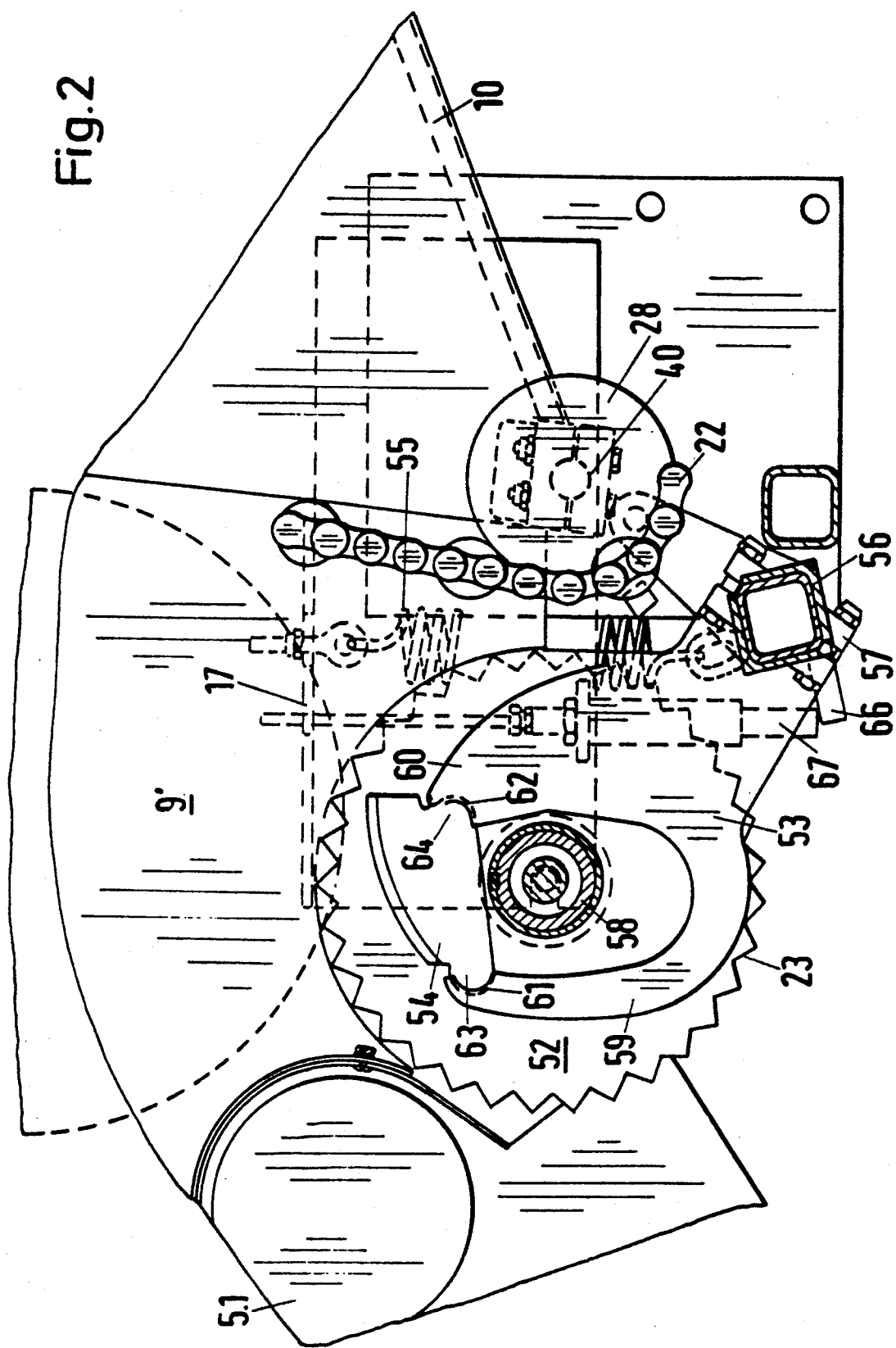
FIG. 2 shows the section of the arrangement marked "Z" in FIG. 1 on an enlarged scale in the starting position of the cutting tools.
Figure 3:
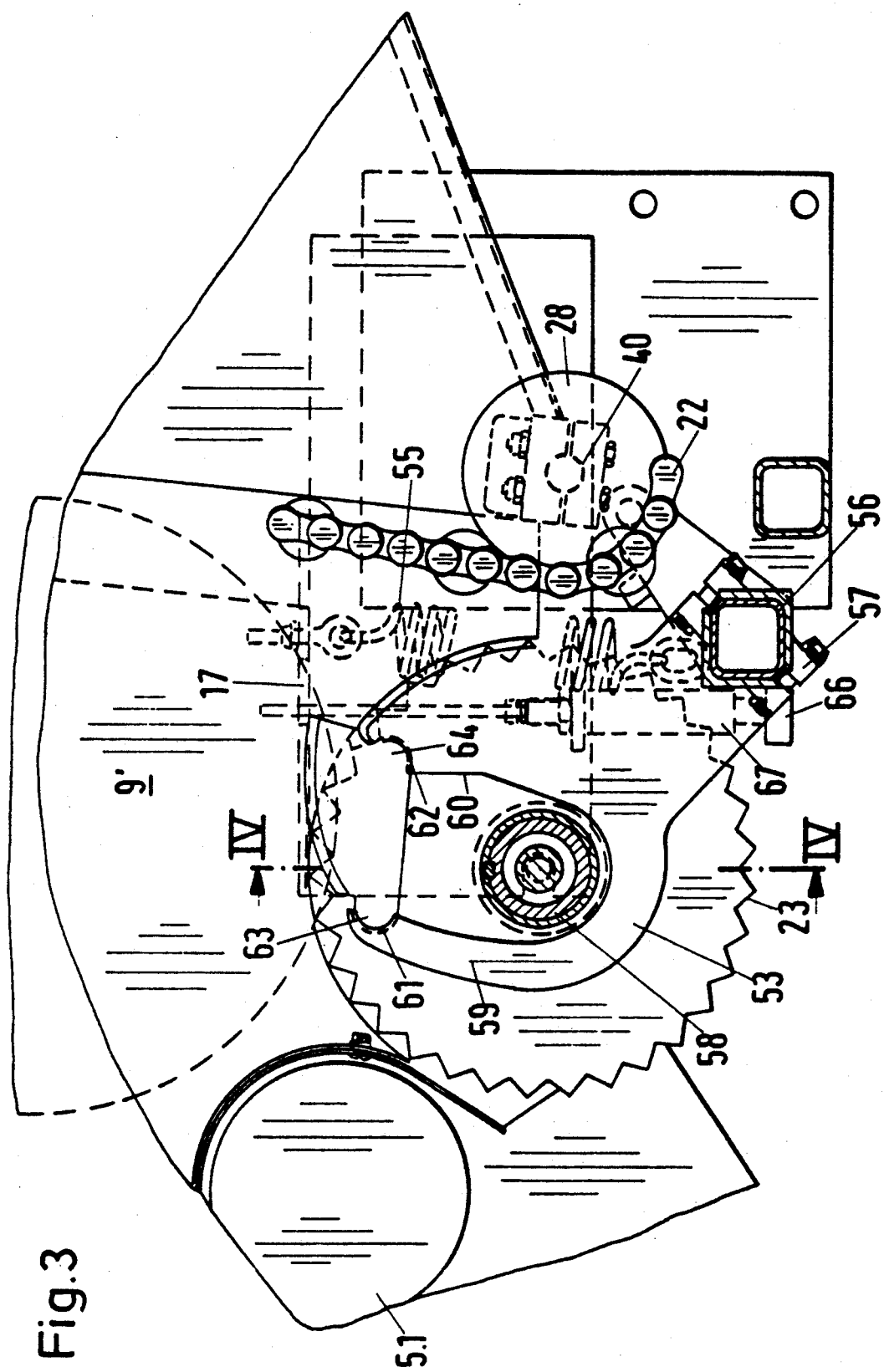
FIG. 3 is a representation similar to FIG. 2, with the cutting knives transferred into the cutting position.

In the embodiment of the conveyor roller shown, the harvested crops conveyor 23 is constructed with conveyor roller segments 51. Moreover, the harvested crops conveyor 23 has essentially annular accommodating spaces 52 (FIG. 4), which are provided next to and at a distance from one another and are intended for the disposal of tool holders 53 of cutting tools 54. As shown in FIG. 2, the cutting tools 54 are disposed in such a manner in the accommodating spaces 52 of the harvested crops conveyor 23 in their initial cutting position, that they do not extend beyond the shell of the latter and therefore cannot develop their cutting action. Moreover, they can also be secured in such a manner, that their swivelling path is variable, with the consequence that they can assume different cutting positions with respect to different depths of penetration of the bales. In the representation of FIG. 3, the cutting tools are transferred into their cutting position and protrude with arc-shaped cutting blades, which enlarge in the conveying direction and towards the bale that is being formed, over the shell of the harvested crops conveyor 23, so that they therefore reliably cut with a pulling cut the mats of harvested product, which are to be formed in the bale 9', since the bale furthermore is pressed by the revolving bale conveyors 15, 16 onto or against the harvested crops conveyor 23 and the cutting tools.

Figure 5:
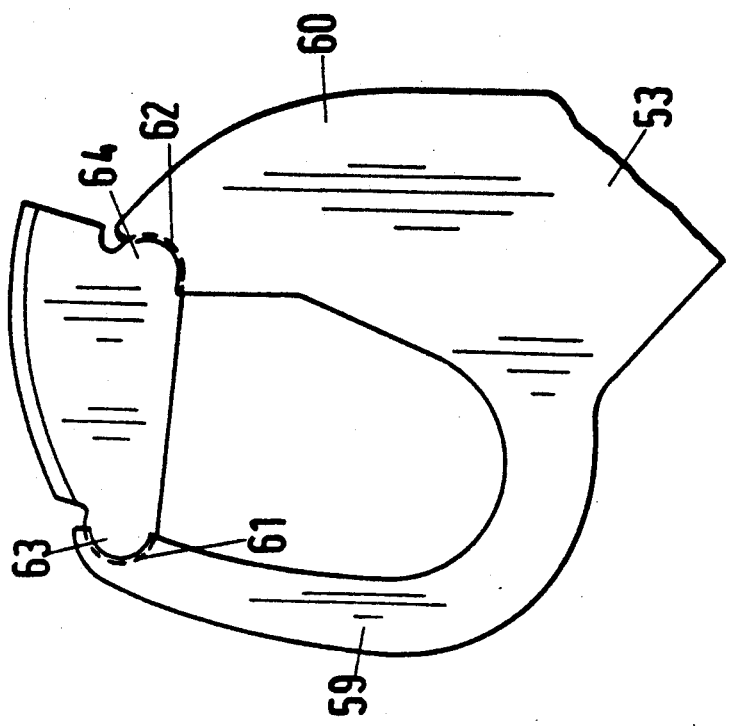
FIG. 5 shows a section of a side view of the arrangement of a knife holder.
Figure 7:
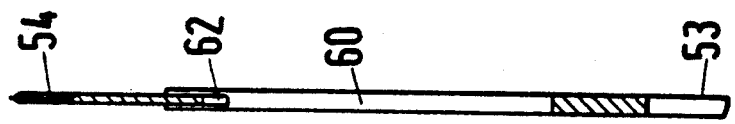
FIG. 7 shows a sectional representation along the line VII—VII of FIG. 6.
Figure 6:
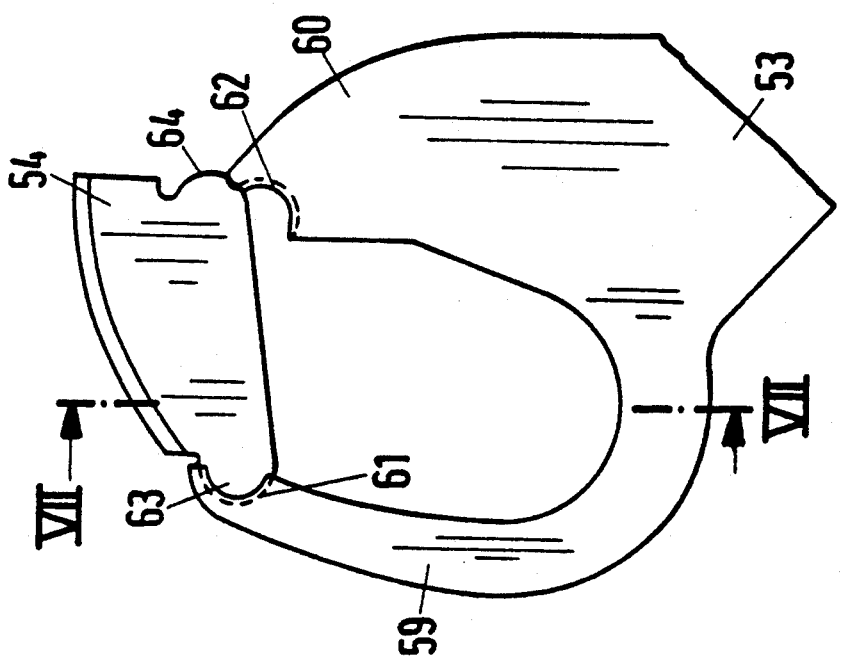
FIG. 6 shows a representation similar to that of FIG. 5 with the cutting tool in a different position.

In the embodiment of FIGS. 2 and 3, the tool holders 53 are secured by way of a clamp connection 57 at a switching pipe 56, which can be swiveled and can be acted upon by a spring 55. In the embodiment shown, the respective tool holder has molded holding shoulders 59 and 60, which embrace the axle shaft 58 of the harvested crops conveyor 23. These molded holding shoulders and the tool holder can also be constructed so that they overlap the axle shaft 58. One of the forkshaped molded holding shoulders is constructed so as to be flexible, in order to make it possible to put the cutting tools in place and to take them out easily. At the holding ends of the molded holding shoulders 59 and 60, these have form recesses in the shape of a continuous milled groove (FIGS. 5, 6 and 7), into which the corresponding holding shoulders 63 and 64 of the cutting tools can be inserted and, by means of a tool, can also be levered out again, without requiring any other means of fastening, as shown diagrammatically in FIG. 6. The cutting tools 54 are therefore to be clamped there. Due to the arched course of the cutting blades of the tools, the force is initiated during the operation of the machine in such a manner on the tool holder, that it is introduced in the molded holding shoulder 60 on the right in the drawing and therefore also developed more strongly and can be passed on directly to the switching pipe 56.

Figure 4:
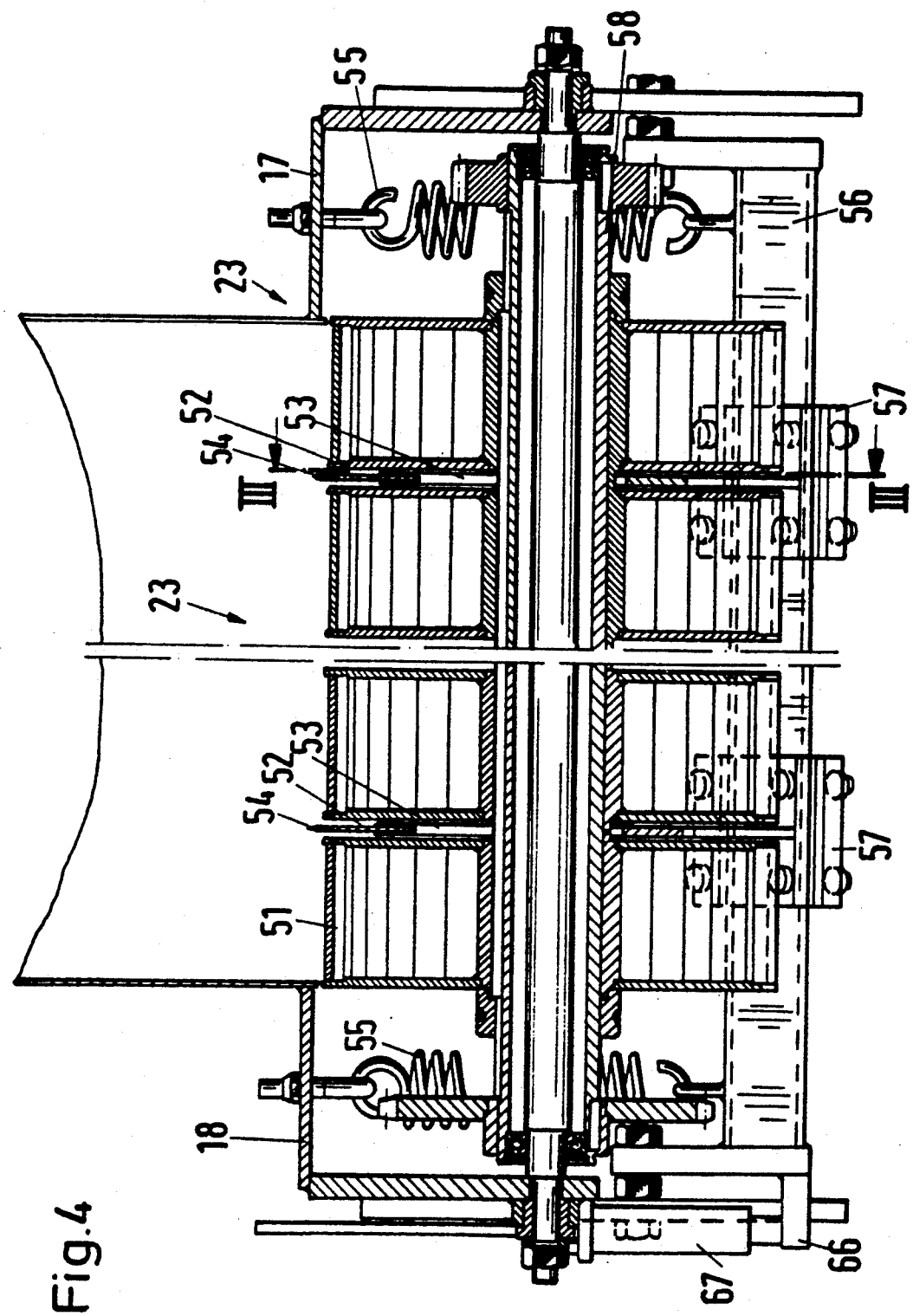
FIG. 4 shows a sectional representation along the line IV—IV in FIG. 3.
Figure 8:
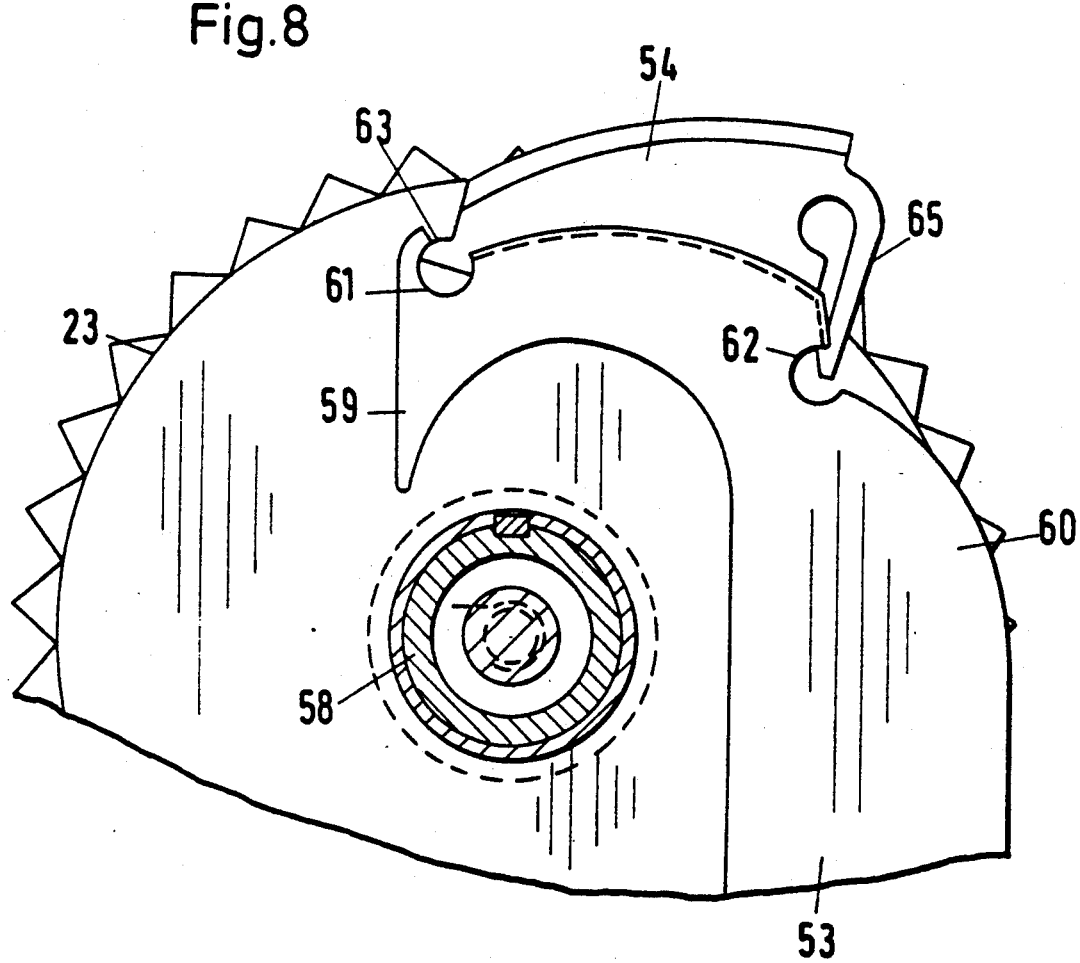
FIG. 8 shows a section of a side view of an alternative embodiment of a knife holder and a cutting tool.

FIG. 8 shows an alternative embodiment of a tool holder 53 and a cutting tool 54, in which the tool holder 53 likewise once again has form recesses 61 and 62. The cutting tool also has a mounting shoulder 63, which on the other side has a latch shoulder 65, which is constructed to be self-elastic and, in the assembled state, grips behind the stop of the form recess 62. Here also, the tool holder 53 is constructed so that it overlaps the axle shaft 58 of the conveyor roller. One end of the spring 55 (FIG. 2) acts on the switching pipe 56, while the other end is supported at a housing wall part 17, 18 (FIG. 4). With that, the cutting tools are safeguarded against being overloaded and can, moreover, be transferred into their cutting position when the switching lifting cylinder 67, which engages a stop 66 of the switching pipe 56, is depressurized.

Figure 9:
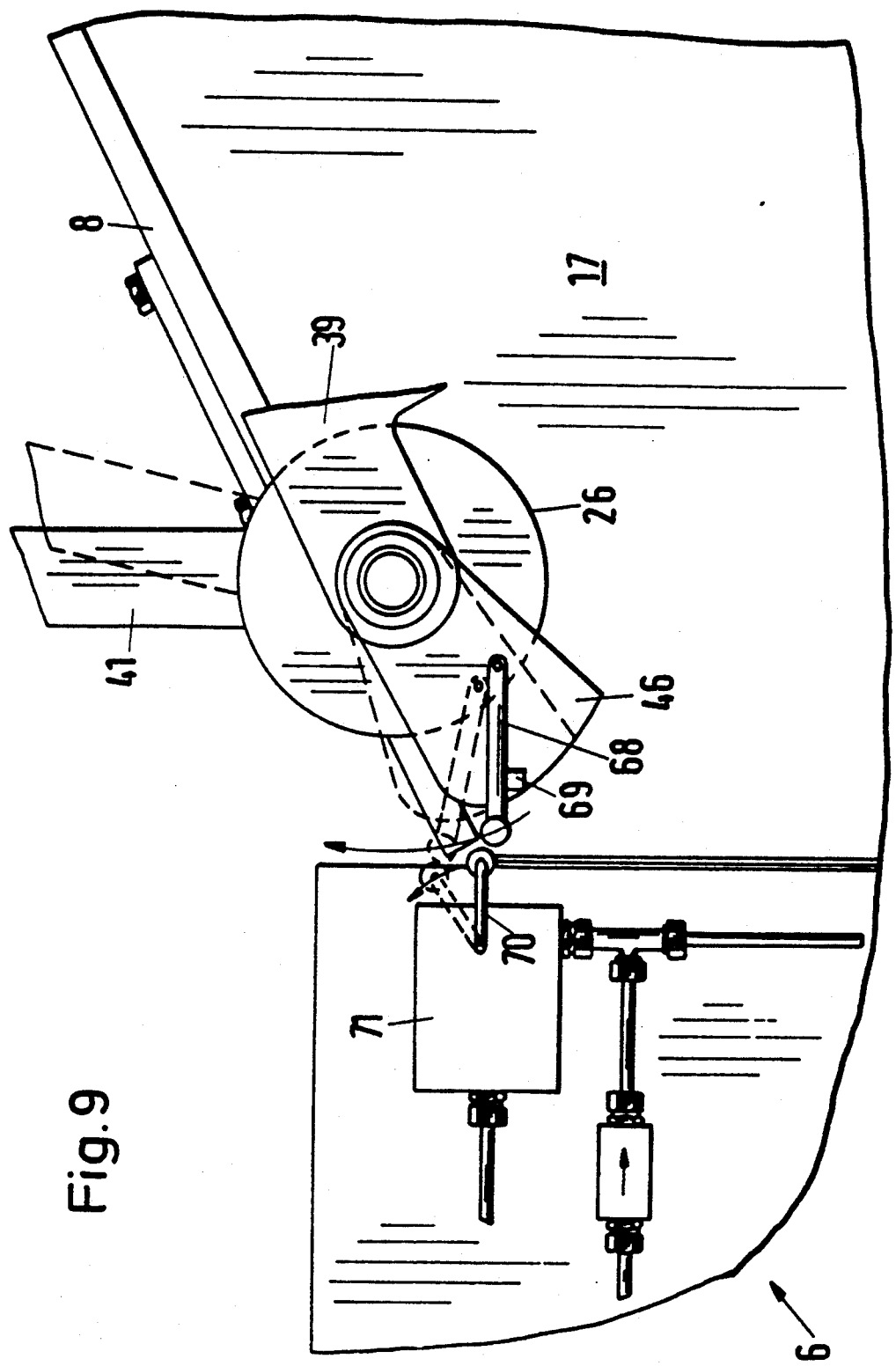
FIG. 9 enlarges the section of the illustrated embodiment marked "X" in FIG. 1 in the area of the tension and the compensating roller and the adjusting levers for activating the on-off valve of the switching arrangement during the process of switching on the cutting tools, the switched-on position being shown by a broken line.
Figure 10:
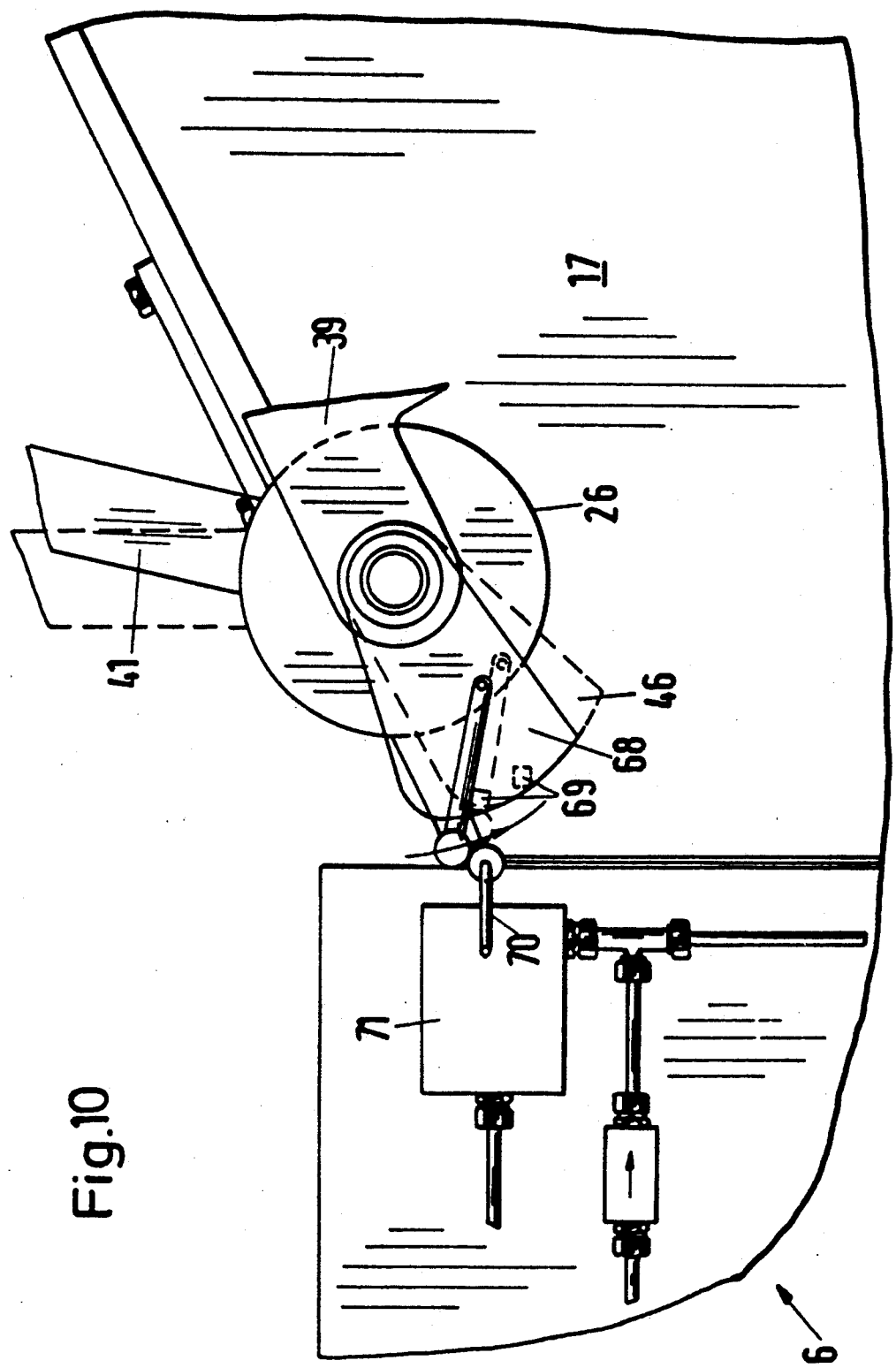
FIG. 10 shows a representation similar to that of FIG. 9, in an operating position of the parts on opening the coiling chamber.

As can be inferred particularly from FIGS. 9 and 10, an adjusting lever 68 with an abutment 69 is coupled to the connecting arm 46 of the lever 41 of the tension and compensating roller 42. This adjusting lever 68 acts on an adjusting lever 70 of a hydraulic on-off valve 71. Over this on-off valve 71, the switching lifting cylinder 67 is acted upon by the hydraulic medium or depressurized, as is explained in greater detail by means of FIG. 11. The on-off valve 71 is integrated in the hydraulic circuit of the machine, as well as of the switching mechanism of the enveloping facility or the net-coiling apparatus 6. The cutting tools are released for the first time in the following way. The machine, which has, for example, just been hitched to a tractor and connected with a pressure-medium connection with the tractor, is first of all opened hydraulically over the cylinder 14 and closed again without the bale conveyors of the machine being driven. After that, the operator activates the starting mechanism of the net-coiling facility, so that the switching, lifting cylinder 67 is acted upon by the pressure medium from an accumulator. After that, the machine is started up. When the machine is started up, the cutting tools therefore are in their initial cutting position within the harvested crops conveyor 23 because of the switching cylinder 67, which is acted upon by the pressure medium. When, with increasing size, the lever 41 and, with that, the connecting arm 46 reaches the clockwise-placed swiveling position, which is indicated by the broken line in FIG. 9, the adjusting lever 70 is likewise transferred by way of the adjusting lever 68 into the corresponding position (broken line). In so doing, the adjusting lever 68 is supported on the abutment 69. When the adjusting lever 70 reaches its switching-on position, the on-off valve 71 is activated and the switching lifting cylinder 67 is depressurized, whereupon the knives are swung by means of the springs 55 into their cutting position by way of the switching pipe 56. As the enveloping facility starts up, the cutting tools are transferred back again into their initial cutting position. Hydraulically therefore, the release apparatus for the enveloping facility is constructed in such a manner hydraulically, as explained in detail in the aforementioned German Patent Appln. P 40 12 741.9. The switching arrangement is coupled hydraulically with this hydraulic circuit of the enveloping facility, so that when the enveloping facility is started, the lifting cylinder 67 is acted upon by the hydraulic medium and the cutting tools are transferred back again into their initial cutting position.

Figure 11:
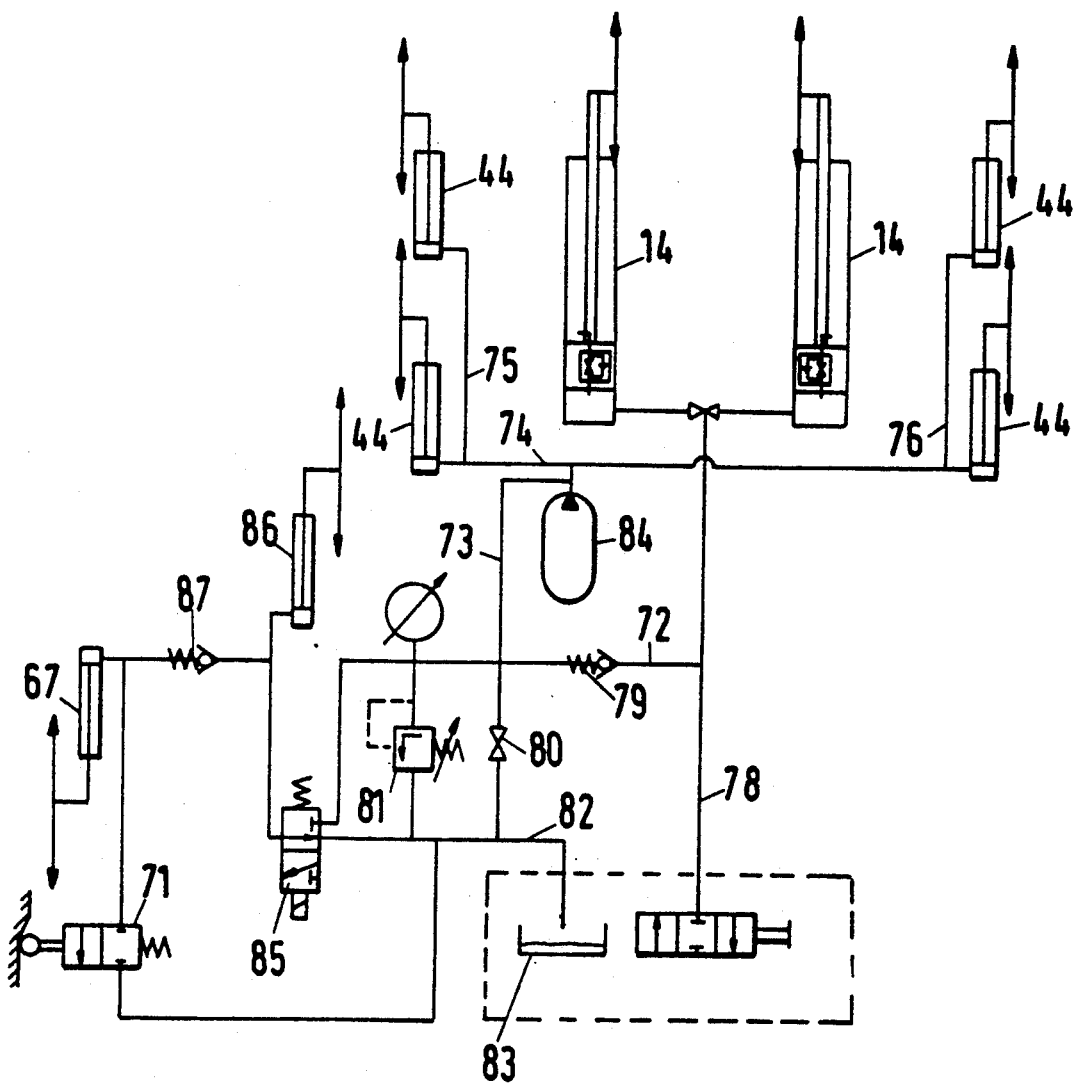
FIG. 11 shows the connection of the hydraulic on-off valve to the hydraulic system of the machine with hydraulic parts for swinging open the coiling chamber and for operating an enveloping apparatus.

In FIG. 11, the hydraulic system of the machine is shown in greater detail, in much the same way as the basic structure is, however, also shown in the German Patent Appln. P 40 12 738.9, which is hereby incorporated herein by reference. The hydraulic cylinders are connected to the hydraulic system of the tractor over a common pressure line. The cocking cylinder 44 of the two belt conveyors 15 and 16 that have been provided are connected over the connecting lines 72, 73, 74, 75 and 76 to the central pressure medium supply line 78. The connecting line 72 has a check valve 79. The connecting line 73 is furthermore still provided with a shut-off valve 80, which is closed during the operation of the machine and enables, for example, in the park position, the hydraulic system to be emptied. Line 72 likewise also has a pressure control valve 81, with which the whole installation can be set in the present case to a maximum, adjustable operating pressure, so that, in the event that the operating pressure is exceeded, pressure medium can be discharged through a line 82 into a tank 83. Line 73 is likewise also connected to a central accumulator 84. While the machine is being operated, the lifting cylinders 14 as well as the cocking cylinders 44 are acted upon by the pressure medium over a central supply line 78. The operating pressure of the lifting cylinders 14 is less than that of the cocking cylinders 44, so that the operating pressure of the cocking cylinders 44 can be adjusted by way of the pressure control valve 81 that is connected to the pressure supply line 78. If, in so doing, the permissible operating pressure is exceeded, it is reduced over the pressure control valve. For an enveloping process and before the bale is ejected, the actuating cylinder 86 of the starting device of the enveloping facility is acted upon by the pressure medium supply by means of the valve 85, which can be actuated electromagnetically. The switching lifting cylinder 67 of the switching equipment of the cutting apparatus of the conveyor roller is also connected over a check valve 87 to this pressure medium supply, so that, with the actuation of the cylinder 86, the cylinder 67 is also supplied likewise with pressure medium. The on-off valve 71 is also integrated into this circuit, so that, after the on-off valve 71 is actuated in the sense of being opened, the pressure medium of the lifting cylinder 67 can be discharged into the tank 83.

What we claim is:

1. A machine for receiving and compressing an agricultural harvested crop comprising:
    a chassis support means;
    bale conveyor means carried by said chassis support means and having two conveyor parts spaced from one another to define a bale-forming space between said two conveyor parts, said bale conveyor means comprising a first conveyor device and a second conveyor device with said first conveyor device including said first conveyor part and said second conveyor device including said second conveyor part;
    movable means for moving one of said conveyor parts relative to the other conveyor part, said movable means comprising pivotal means for pivotably moving said first conveyor device on said chassis support means; and
    a crop conveyor means carried by said chassis support means and juxtaposed to said bale-forming space, said crop conveyor means comprising pivotal cutting tool means pivotably movable between an initial position juxtaposed to said bale-forming space and a cutting position disposed within said bale-forming space.

2. A machine according to claim 1, wherein said pivotal cutting tool means comprises cutting tool holders mounting cutting tools, and operable means for pivoting said cutting tool holders between said initial position and said cutting position.

3. A machine according to claim 1 further comprising a harvested crop receiving means carried on said chassis support means, said harvested crop receiving means being forward of said crop conveyor means considered in the direction of movement of the machine during its operation.

4. A machine for receiving and compressing an agricultural harvested crop comprising:
    a chassis support means;
    bale conveyor means carried by said chassis support means and having two conveyor parts spaced from one another to define a bale-forming space between said two conveyor parts;
    movable means for moving one of said conveyor parts relative to the other conveyor part; and
    a crop conveyor means carried by said chassis support means and juxtaposed to said bale-forming space, said crop conveyor means comprising pivotal cutting tool means pivotably movable between an initial position juxtaposed to said bale-forming space and a cutting position disposed within said bale-forming space, said pivotal cutting tool means comprising cutting tool holders and cutting tools mounted on said cutting tool holders, said crop conveyor means comprising a conveyor roller having annular receiving spaces which accommodate said cutting tool holders.

5. A machine according to claim 4, wherein said cutting tool has a resilient latch portion which resiliently mounts said cutting tool on said cutting tool holder.

6. A machine according to claim 4, wherein said conveyor roller has an outer periphery, said cutting tools being disposed within said outer periphery when in said initial position, said cutting tools being disposed outside said outer periphery when in said cutting position.

7. A machine according to claim 6, wherein said cutting tools when in said cutting position have an outer boundary which extends outside of said outer periphery in different amounts, said outer boundary of said cutting tools having a leading portion and a trailing portion considered in the direction of rotation of said conveyor roller with said leading portion extending further outside of said outside periphery than said trailing position.

8. A machine according to claim 7, wherein said cutting tools have an arcute configuration which progressively increases in size from said leading portion to said trailing portion.

9. A machine according to claim 4, wherein said conveyor roller has an axis of rotation, said cutting tool holder having a generally U-shaped configuration having two spaced legs which straddle said axis of rotation.

10. A machine according to claim 9, wherein at least one of said two spaced legs is flexible.

11. A machine according to claim 9, wherein said two spaced legs resiliently mount said cutting tool.

12. A machine according to claim 9, wherein each of said two spaced legs has mounting recesses, said cutting tools having mounting parts received in said mounting recesses to thereby mount said cutting tool on said tool holder.

13. A machine for receiving and comprising an agricultural harvested crop comprising:
    a chassis support means;
    bale conveyor means carried by said chassis support means and having two conveyor parts spaced from one another to define a bale-forming space between said two conveyor parts;
    movable means for moving one of said conveyor parts relative to the other conveyor part; and
    a crop conveyor means carried by said chassis support means and juxtaposed to said bale-forming space, said crop conveyor means comprising pivotal cutting tool means pivotally movable between an initial position juxtaposed to said bale-forming space and a cutting position disposed within said bale-forming space, said pivotal cutting tool means comprising cutting tool holders and cutting tools mounted on said cutting tool holders, said pivotal cutting tool means further comprising a pivotal support on said chassis support means which pivotally supports said cutting tool holders for movement between said initial and said cutting positions, said pivotal cutting tool means further comprising control mens for pivoting said cutting tool holders, said control means pivoting said cutting tool holders to said initial position, said pivotal cutting tool means further comprising biasing means biasing said cutting tool holder toward said cutting position.

14. A machine for receiving and compressing an agricultural harvested crop comprising:
    a chassis support means;
    bale conveyor means carried by said chassis support means and having two conveyor parts spaced from one another to define a bale-forming space between said two conveyor parts;
    movable means for moving one of said conveyor parts relative to the other conveyor part;

a crop conveyor means carried by said chassis support means and juxtaposed to said bale-forming space, said crop conveyor means comprising pivotal cutting tool means pivotally movable between an initial position juxtaposed to said bale-forming space and a cutting position disposed within said bale-forming space; and actuatable operating means operable to effect pivoting of said pivotal tool cutting means, said actuatable operating means being actuated by said bale conveyor means when the bale being formed in said bale-forming space reaches a predetermined size.

15. A machine according to claim 14, wherein said actuatable operating means comprises means comprises a power operated cylinder for pivoting said pivotal tool cutting means from said cutting position to said initial position, said actuatable operating means further comprising biasing means for pivoting said pivotal tool cutting means from said initial position to said cutting position, said biasing means being operable to biasingly retain said pivotal tool cutting means in said cutting position.

16. A machine for receiving and compressing an agricultural harvested crop comprising:

a chassis support means;

bale conveyor means carried by said chassis support means and having two conveyor parts spaced from one another to define a bale-forming space between said two conveyor parts, said bale conveyor means comprising a first endless conveyor and a second endless conveyor with said first endless conveyor including said first conveyor part and said second endless conveyor including said second conveyor part, said bale conveyor means further comprising tensioning means for tensioning said first and second endless conveyors and operable to provide a progressively increasing bale-forming space as the bale formed in said bale-forming space progressively increases in size, said tensioning means having an actuating part which is movable to an actuating position as said bale-forming space increases in size;

movable means for moving one of said conveyor parts relative to the other conveyor part;

a crop conveyor means carried by said chassis support means and juxtaposed to said bale-forming space, said crop conveyor means comprising pivotal cutting tool means pivotally movable between an initial position juxtaposed to said bale-forming space and a cutting position disposed within said bale-forming space; and control means actuated by said actuating part for controlling the pivotable movement of said pivotal cutting tool means such that when said actuating part reaches said actuating position, said pivotal cutting tool means is pivoted from said initial position to said cutting position.

17. A machine according to claim 16, wherein said control means comprises a switching means which is operated by said actuating part when said actuating part reaches said actuating position.

18. A machine according to claim 17, wherein said control means comprises a valve moveable between an on and an off position, said control means further comprising a power-operated cylinder controlled by said valve for pivoting said pivotal cutting tool means from said cutting position to said initial position, said control means further comprising biasing means for pivoting said pivotal cutting tool means from said initial position to said cutting position.

19. A machine according to claim 17 further comprising enveloping means for enveloping a bale that is formed in said bale-forming space with an enveloping sheet, said control means being operable to actuate said enveloping means.

20. A machine according to claim 16, wherein said first and second endless conveyors are operable to press the bale being formed in said bale-forming space against said crop conveyor means.

* * * * *